US009079984B2

(12) United States Patent
Witte et al.

(10) Patent No.: US 9,079,984 B2
(45) Date of Patent: Jul. 14, 2015

(54) PROCESS FOR THERMAL SEPARATION OF A SOLUTION CONSISTING OF THERMOPLASTIC POLYMER AND SOLVENT

(75) Inventors: Daniel Witte, Grenzach-Wyhlen (DE); Thomas Isenschmid, Magden (CH); Manuel Steiner, Basel (CH)

(73) Assignee: List Holding AG, Arisdorf (CH)

( * ) Notice: Subject to any disclaimer, the term of this patent is extended or adjusted under 35 U.S.C. 154(b) by 371 days.

(21) Appl. No.: 13/807,400

(22) PCT Filed: Jun. 29, 2011

(86) PCT No.: PCT/EP2011/003193
§ 371 (c)(1),
(2), (4) Date: Feb. 27, 2013

(87) PCT Pub. No.: WO2012/000658
PCT Pub. Date: Jan. 5, 2012

(65) Prior Publication Data
US 2013/0153158 A1    Jun. 20, 2013

(30) Foreign Application Priority Data

Jun. 30, 2010   (DE) .......................... 10 2010 017 653
Nov. 3, 2010   (DE) .......................... 10 2010 060 320

(51) Int. Cl.
| C08G 63/00 | (2006.01) |
| C08F 6/12 | (2006.01) |
| B01J 3/00 | (2006.01) |
| B01J 8/00 | (2006.01) |
| C08G 63/02 | (2006.01) |

(52) U.S. Cl.
CPC . *C08F 6/12* (2013.01); *B01J 3/008* (2013.01); *B01J 8/005* (2013.01)

(58) Field of Classification Search
USPC .......................... 528/176, 190, 192, 193, 501
See application file for complete search history.

(56) References Cited

U.S. PATENT DOCUMENTS

| 2008/0188950 A1 | 8/2008 | Fleury et al. |
| 2009/0163642 A1 | 6/2009 | Kiss et al. |

FOREIGN PATENT DOCUMENTS

| DE | 19533693 A1 | 3/1997 |
| DE | 10120391 A1 | 11/2002 |
| DE | 10150900 C1 | 4/2003 |
| DE | 10160535 A1 | 6/2003 |
| DE | 102005001802 A1 | 4/2006 |
| EP | 0517068 B1 | 6/1995 |
| EP | 0451747 B1 | 8/1995 |
| EP | 1078682 B1 | 4/2006 |
| WO | 96/22156 | 7/1996 |
| WO | 97/12666 | 4/1997 |

OTHER PUBLICATIONS

European Patent Office; International Search Report and Written Opinion issued in counterpart PCT/EP/2011/003193. Date of Mailing: Nov. 4, 2011.
European Patent Office; International Preliminary Report on Patentability issued in counterpart PCT/EP/2011/003193. Date of Mailing: Oct. 4, 2012.

*Primary Examiner* — Terressa Boykin
(74) *Attorney, Agent, or Firm* — Dykema Gossett PLLC

(57) ABSTRACT

A process for thermal separation of a solution comprised of a thermoplastic polymer and a solvent involves heating a solvent under pressure above a critical point of the solvent; decompressing the heated solvent in a first vessel, such that a polymer-rich and a low-polymer phase form; and supplying the polymer-rich phase to a second vessel. In embodiments, on entry into the second vessel, a pressure jump occurs, the pressure jump leading to a thermal flash in the second vessel such that a polymer part of the polymer-rich phase rises to at least 70%, and a resulting polymer-rich solution is provided.

6 Claims, 2 Drawing Sheets

PROCESS FOR THERMAL SEPARATION OF A SOLUTION CONSISTING OF THERMOPLASTIC POLYMER AND SOLVENT

CROSS-REFERENCE TO RELATED APPLICATION

This application is a national stage filing based upon International PCT Application No. PCT/EP2011/003193, with an international filing date of Jun. 29, 2011, which claims the benefit of priority to German patent application Nos. 10 2010 017 653.2 filed Jun. 30, 2010; and 10 2010 060 320.1, filed Nov. 3, 2010, both of which are fully incorporated herein by reference as though fully set forth herein.

The invention relates to a process for the thermal separation of a solution consisting of thermoplastic polymer and solvent in which the solvent is heated under pressure above the critical point of the solvent and then decompressed into a vessel such that a polymer-rich phase and a low-polymer phase form, and wherein the polymer-rich phase is supplied to a second vessel,

BACKGROUND

The specified invention represents an improvement of an existing process for the thermal separation of solvents from thermoplastic plastic materials, particularly elastomers. U.S. Pat. No. 3, 726,843 discloses a process of this kind for the separation of an alcane, particularly hexane, from ethylene propylene diene monomer (EPDM) rubber. U.S. Pat. No. 6,881,800 discloses a similar process with the difference that U.S. Pat. No. 3,726,843 demonstrates the thermodynamic states in clearer detail. These processes are based on similar separation techniques of polyethylene or polypropylene from hexane, which have been in use on an industrial scale for quite a long period of time.

The fundamental advantage of the mentioned processes lies in the fact that, during the process steps, the polymer is always present in dissolved form, as a melt or as a melt-type paste. This is achieved by adding an alcane to the monomer mixture during the polymerization step. Under a certain pressure, the monomers are polymerized in hexane at high degrees of conversion The solution is then, in addition, possibly decompressed and heated indirectly to a certain temperature using a single or a plurality of heat exchangers, wherein the pressure must be selected such that the polymer always remains nicely soluble inside the solvent to avoid the formation of deposits in the heat exchanger. In one example on an industrial scale with hexane as a solvent, the necessary pressure is approximately 50 to 80 bar (gauge), the necessary temperature 220 to 240° C. The solvent now undergoes flashing inside a separator to achieve 20 to 30 bar, wherein in the range slightly above critical a polymer-containing phase and a lighter, low-polymer phase form. These phases can then be separated by way of the difference in densities thereof. The temperature decrease in this pressure jump is minimal, because there is no enthalpy of vaporization in the above-critical range. The heat of the separated, low-polymer phase is therefore usable for heating the educt, which represents an essential advantage in terms of process technique. In a static flash vessel, the resulting polymer-rich phase undergoes further flashing to pressures between 1 bar (gauge) and 10 bar (gauge), wherein the pressure is selected such that the flash is as complete as possible, while the polymer-containing bottom, however, remains in the form of a melt. The bottom can be supplied to a degassing extruder or kneader by means of a polymer pump or a valve, inside which any remaining solvent and monomer residues are removed in an absolute or partial vacuum.

For the above process to work, a sufficient enthalpy gradient must be present such that, after flashing, the polymer remains in the form of a melt inside the two separators or the drawing-in of the degasser. This aspect limits said process, as many polymers have a maximum temperature before thermal degradation sets in that is below a range of 220 to 240° C. The use of a low-molecular solvent or of the monomer as a solvent is conceivable (in the presence of restricted solubility of the polymer in the monomer); however, in this case. the flash stage then results in temperatures that are far below the melting point. This problem, among others, is an issue with polystyrols or polybutadienes. While polybutadiene is not a thermoplastic material, it behaves, however, like a melt over a very restricted temperature range. In addition, with increasing molecular weight and copolymers, the melting point increases. This results in high torques, the formation of fine particles and reduced performance for higher-molecular EPDMs inside the degasser.

A further disadvantage of the existing process is the fact that the polymer-rich bottom is drawn from the flash container gravimetrically. If the viscosity of the bottom is too high, the pressure loss of the flow results in pressures that lead to strong cavitation of the bottom. This causes the transporting power of the supplied pump to be effectively limited. In high-molecular products. it was observed that the degasser downstream of the flash vessel suffers from operation-related problems, because the temperature of the bottom from the flash vessel drops due to the pressure jump, and the product tends to solidify. The product is then pulverized into particles by the shaft, which can plug up the exhaust vapor lines. Due to the fact that the heat transfer of the heating walls of the degasser is especially poor with high-molecular products, a considerable part of the volume is needed to heat the polymer particles above the plastification range at which point the shaft generates sufficient torque for heating the product by means of mechanical energy. This way, the degassing capacity of the degasser is substantially reduced, particularly in large-scale facilities, because the ratio of surface areas to volume becomes increasingly less favorable the larger the equipment size. Moreover, although the particles have a large surface, they do not dynamically change their surface areas, as is the case inside a melt. This further restricts the degasification capacity.

Object

It is the object of the present invention to improve a thermal separation process for polymer from solvent in high-molecular products and heat-sensitive polymers with regard to a higher molecular weight, less fine particle formation inside the degasser, higher capacity, lower residual contents of undesired volatile substances in the product of the degasser and lower energy consumption in comparison to existing processes.

BRIEF SUMMARY

The object is achieved in that
a) a pressure jump on entry into the second vessel leads to a thermal flash in the second vessel, the polymer part of the heavy phase rising to at least 70%, especially more than 80%; and
b) the resulting polymer-rich solution is supplied—especially distributed over at least a portion of the length of a stirrer shaft—which is within the same vessel space and which heats the polymer composition by mechanical kneading energy with the effect that the polymer content rises to >70%, particularly >90%.

In order to improve the aforementioned process, it is proposed according to the invention that the flash vessel be replaced with a mixer having a, for example, horizontal kneader. The flashed solution or suspension is distributed over the length of the kneader upon a hot bed and kneaded into the same. This can be achieved by means of a single feed location or a plurality of feed locations.

In terms of process technique, kneading a substance into a kneading bed is referred to as reconversion. Reconversion allows the stirring bed to have a higher temperature or lower solvent concentration than the supplied material flow. The energy that is needed for the additional evaporation capacity is supplied by means of the kneading energy via the dissipated power by the kneading shaft. The product space is, similarly to the flash vessel it replaces, operated under positive pressure in order to limit the speed of the exhaust vapor gas by means of the increased density.

However, due to the fact that the kneader is effectively able to discharge even highly viscous products by means of forced-transporting, the limitation as to discharge that the existing process suffers from (supplying the discharge pump) is omitted. The discharge is implemented by the geometry of the stirrer or kneader shaft and/or fixtures, wherein the same supply a discharge pump or discharge screw.

The discharge screw can have a pump arranged downstream thereto (for example, a gear-type pump) in order to be better able to control the discharge volume. The kneading process improves the separation of the bottom from the evaporated volatile materials, because any occurring foam is kneaded into the material and thereby mechanically destroyed. The solvent equilibrium of the bottom shifts in favor of a higher solid matter content because of the higher temperature. This way, the separation capacity of this process stage is increased and the load on the then-following degassing stage reduced.

Power absorption by the degassing stage is also reduced, because the product is now supplied with more excess heat. This excess heating results in more effective degassing in the entry area of the degasser and thus better degassing capacity with the same energy input. The higher feed temperature is selected such according to the invention that the product inside the degasser does not solidify, whereby granuiation of the product is avoided. The necessary size of the degasser can therefore be substantially less, which makes up for the additional investment costs incurred in connection with the flash kneader in comparison to a static flash vessel.

One variant of this process provides for supplying a liquid stripping agent across the length of the degasser. The pressure inside the degasser is selected such that the stripping agent evaporates, the material exchange is improved by the formation of bubbles, and with the resulting stripping gas leading to a lower partial pressure of the other volatile substances. According to the invention, the quantity of the stripping agent that is supplied can be selected such that a certain temperature of the polymer melt is maintained. This allows for adjusting the dwelling time inside the degasser in any desired way, because the polymer can never overheat. The residual content of any undesired volatile substances is substantially reduced by the steps according to the invention and/or the capacity of the degasser is substantially increased.

BRIEF DESCRIPTION OF THE FIGURES

Further advantages, characteristics and details of the invention become clear from the following description of preferred embodiments as well as based on the drawing. Shown are in FIG. 1 a schematic block diagram of a process according to the prior art.

Figure 1:
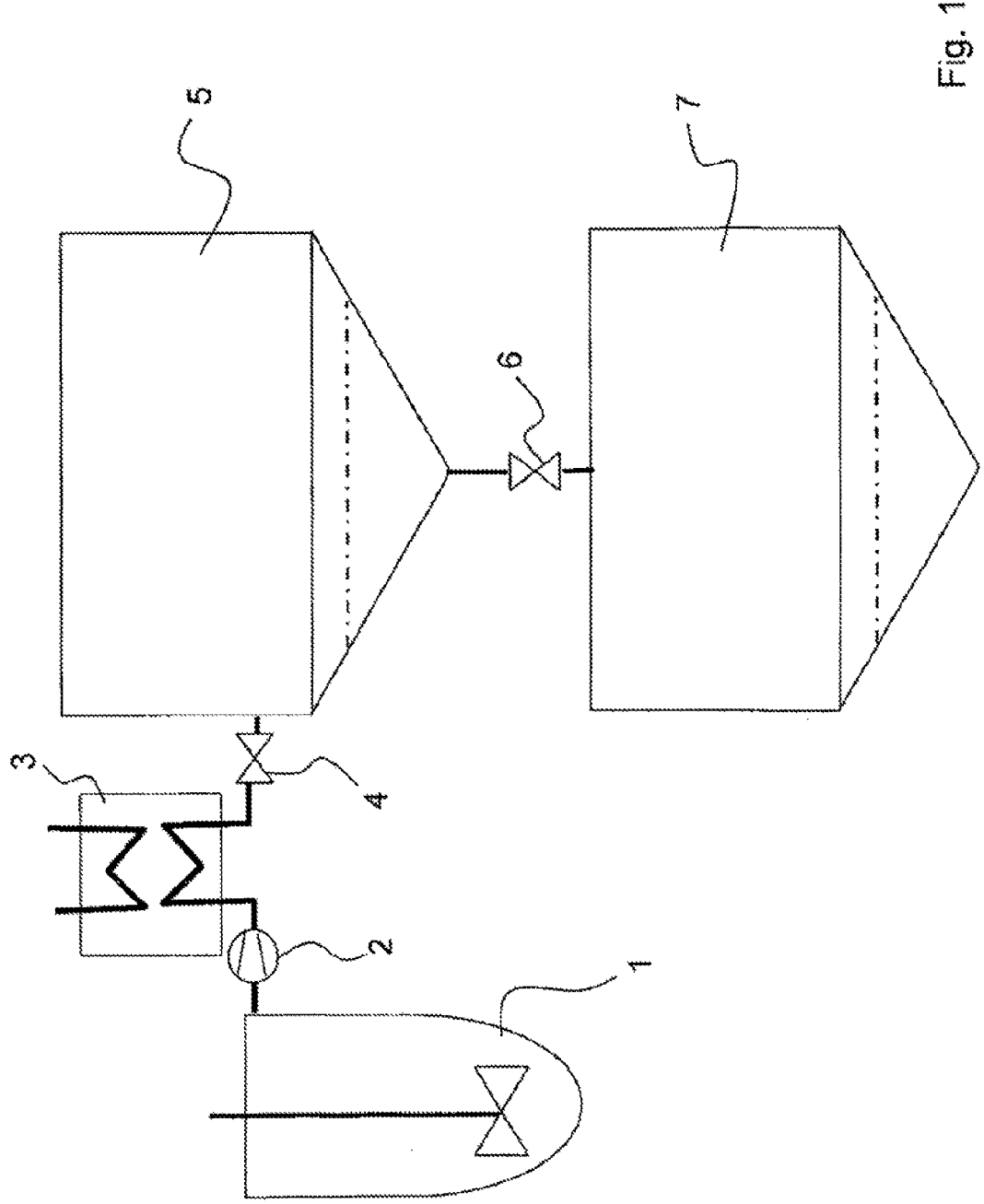

According to the prior art, as seen in FIG. 1, a monomer and a solvent are introduced into a stirred tank 1 inside which polymerization occurs. By means of a pump 2, through a heat exchanger 3 and a valve 4, this solution reaches a high-pressure separator 5 through a flash nozzle. Heating of the solution above the critical point of the solvent occurs inside the high-pressure separator 5 (i.e., the point when there is no longer any gaseous phase, when nothing is left to evaporate), and there results a polymer-rich and a low-polymer phase. The solvent and the low-polymer phase are returned for polymerization in the stirred tank 1.

The polymer-rich phase in turn is routed via a flash nozzle and a valve 6 to a low-pressure separator 7, which is unstirred. From the low-pressure separator 7, the solution reaches a finisher or the solvent reaches a condenser, respectively.

Figure 2:
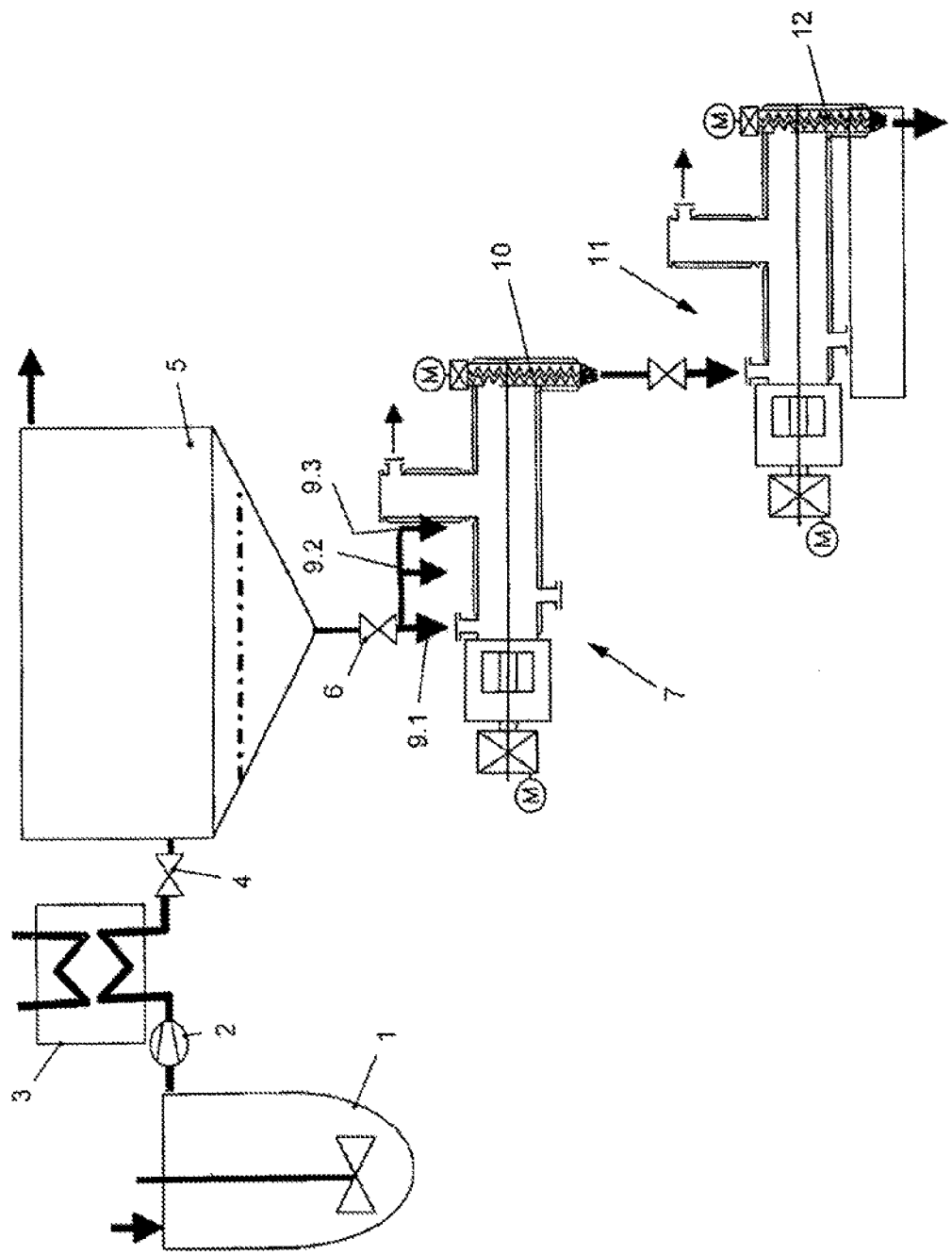
FIG. 2 a schematic block diagram of the process according to the invention.

The invention provides for replacing the low-pressure separator 7 according to FIG. 2 with a kneader mixer 6. A corresponding kneader mixer is disclosed, for example, in DE 591 06 245.3, DE 592 03 529.8/DE 596 08 462.5, DE 596 00 991.7, DE 500 12 557.0, DE 101 20 391.8, DE 101 50 900.6, DE 101 60 535.8 and DE 195 33 693.3. Said kneader mixer can have one or two shafts, can be parallel- or counter-rotating or being operated at different speeds.

The polymer-rich phase is supplied to the kneader mixer 8 at different feed locations 5, which are indicated by reference numerals 9.1, 9.2 and 9.3. These feed locations are distributed across the length of a single or a plurality of stirrer and/or kneader shafts. Said stirrer and/or kneader shafts are not shown in further detail; however, they are arranged horizontally or slanted, and actively route the polymer composition to a discharge 10 such that the treatment of higher viscosities is possible.

From the discharge 10, the product reaches a finisher 11, which can also be a horizontally disposed kneader mixer. Inside the finisher 11, the feed temperature after the pressure jump is adjusted such that the polymer melt is maintained above the solidification range, Furthermore, the invention provides for a liquid stripping agent to be added in the finisher, specifically at a single feed location or at a plurality of feed locations such that, at an adjusted pressure in the vessel space, the stripping agent evaporates, whereby correspondingly the dosed quantity of the stripping agent is used to adjust the temperature of the polymer composition. By a lowering the partial pressure and improvement of the material exchange, it is possible to significantly reduce any achievable content of undesired volatile substances.

The polymer composition then reaches a further processing station via a further discharge 12, presently not shown.

The invention claimed is:

1. A process for thermal separation of a solution consisting of thermoplastic polymer and solvent, whereby the solution is heated under pressure to above the critical point of the solvent and thereafter flashed inside a vessel such that a polymer-rich phase and a low-polymer phase form, wherein the polymer-rich phase is supplied to a second vessel, wherein a) a pressure jump on entry into the second vessel leads to a thermal flash in the second vessel, the polymer part of the heavy phase rising to at least 70%, especially more than 80%; and b) the resulting polymer-rich solution is supplied—especially distributed over at least a portion of the length of a stirrer shaft—which is within the same vessel space and which heats the polymer composition by mechanical kneading energy with the effect that the polymer content rises to >70%, particularly >90%; and wherein c) a flash container is replaced by a mixer;
d) the flashed solution or suspension is distributed on the hot bed over the length of the kneader and kneaded therein, which corresponds to a reconversion;
e) which is implemented via one or a plurality of feed locations;
f) a product space is operated at excess pressure similarly to the flash container, wherein
g) a feed temperature is selected such that a product does not solidify inside the degasser, and whereby there is no granulation of the product, and wherein
h) a flash kneader is used.

2. The process of claim 1, wherein a reconversion inside the second container occurs at the single feed location or a plurality of feed locations.

3. The process of claim 1, wherein the temperature of the polymer composition is maintained above the solidification range by adjustment of the speed and/or torque of the stirrer and/or kneader shaft inside the second vessel, and/or by adjustment of the pressure and/or contact heat.

4. The process of claim 1, wherein the stirrer and/or kneader shaft(s) actively route the polymer composition to a discharge, whereby the treatment of higher viscosities is possible.

5. The process of claim 1, wherein the subsequent finisher, the feed temperature is adjusted such that, after the pressure jump, the polymer composition is maintained above the solidification range.

6. The process of claim 5, wherein, inside the finisher, a liquid stripping agent is added at a single feed location or a plurality of feed locations such that, with adjusted pressure inside the vessel space, the stripping agent evaporates and thus the temperature of the polymer composition is adjusted by means of the dosed quantity of the stripping agent, and any achievable content of undesired volatile substances is significantly reduced by lowering the partial pressure and improving the material exchange.

* * * * *